G. E. KELLAR & E. O. THOMASON.
HYDRANT.
APPLICATION FILED OCT. 5, 1908.
972,384.
Patented Oct. 11, 1910.
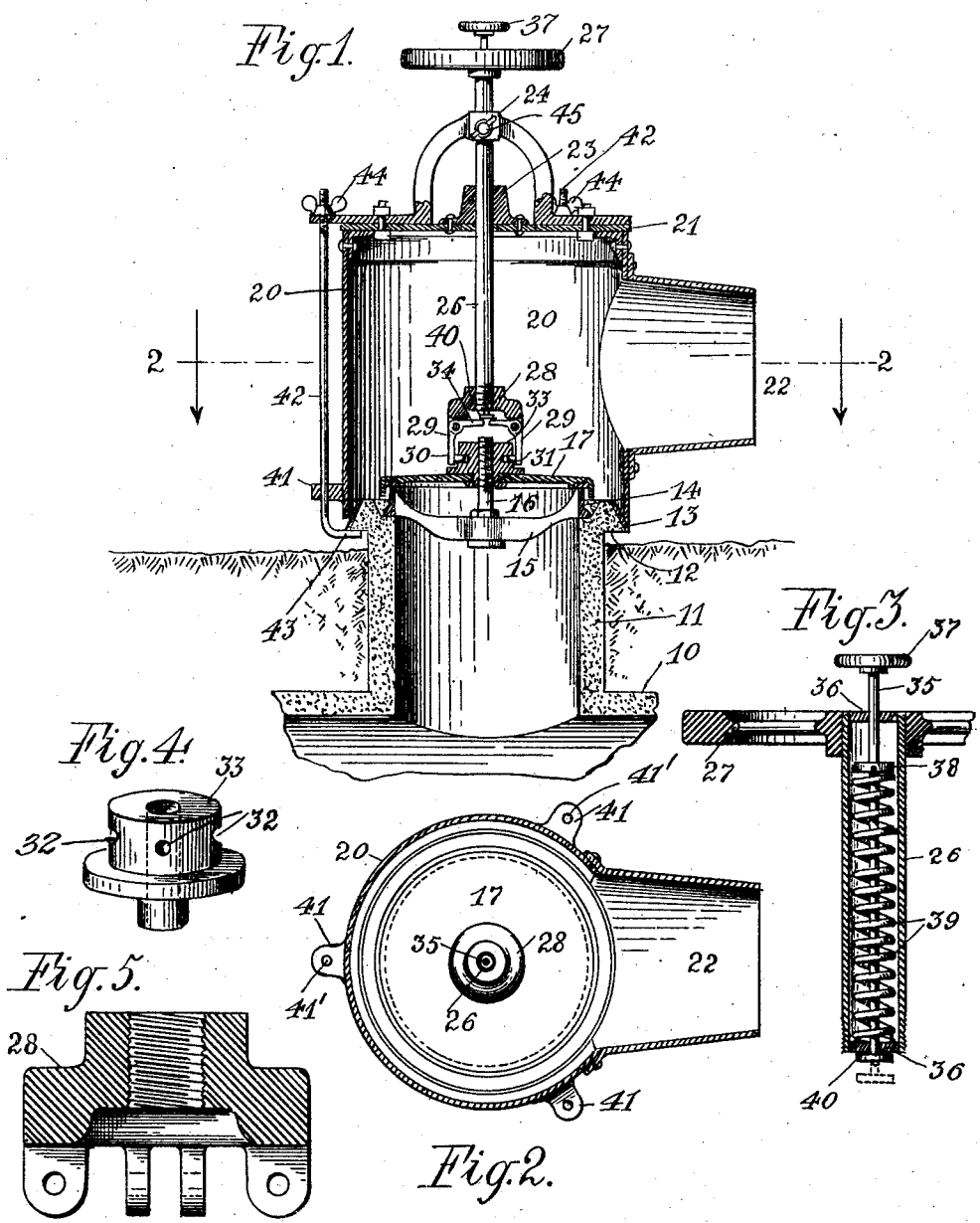
Witnesses.
S. Monteverde
Ollie Palmer.
Inventors,
George E. Kellar,
Elmer O. Thomason,
Hazard Strause
Attorneys

UNITED STATES PATENT OFFICE.

GEORGE E. KELLAR AND ELMER O. THOMASON, OF COVINA, CALIFORNIA, ASSIGNORS TO KELLAR-THOMASON MANUFACTURING COMPANY, OF COVINA, CALIFORNIA, A CORPORATION OF CALIFORNIA.

HYDRANT.

972,384.  Specification of Letters Patent.  Patented Oct. 11, 1910.

Application filed October 5, 1908.  Serial No. 456,116.

*To all whom it may concern:*

Be it known that we, GEORGE E. KELLAR and ELMER O. THOMASON, both citizens of the United States, residing at Covina, in the county of Los Angeles and State of California, have invented new and useful Improvements in Hydrants, of which the following is a specification.

Our invention has relation more particularly to a portable hydrant which can be detachably secured to a stand pipe of an irrigation pipe line.

In the irrigation of large ranches or orchards in semi-arid countries, where irrigation is absolutely essential to the production of crops it has previously been the custom to install concrete pipe lines for the purpose of distributing the water economically to various portions of the ranch or orchards. These pipe lines are connected to a source of water supply, and at intervals along the line and cross connecting lines, (preferably about 50 feet apart) cement stand pipes are erected. The purpose of the stands being to render the irrigation of all sections of the ranch a comparatively easy and simple matter. These stand pipes are preferably controlled by suitable valves of the general type illustrated in the drawings. By means of these valves attached to the stand pipes, a field of grain, alfalfa or the like, adjacent the stand pipes can be flooded or irrigated as the circumstances demand. In the irrigation of especially large ranches of two thousand acres or more it has been found to be impracticable from an economical standpoint and otherwise to have more than a single pipe line, and in such instances it has been customary to attach a temporary pipe line to a stand pipe so as to render it possible to flood large sections at a distance from the pipe line. This method has been found to be entirely satisfactory, resulting in a great saving in the initial expense of installation, but when connecting to a "stand" for this system of irrigation the operator has been obliged to suffer much personal discomfort occasioned by the uncontrolled flow of water when making the connections. By the use of our improved hydrant the above recited inconveniences are largely overcome, and an operator is enabled to first make his temporary connections to a "stand" before operating the valve.

Our device consists essentially in a metallic casing provided with an outlet, designed to be detachably secured to a stand pipe, and means are provided by which the valve of the "stand" can be operated in comparative safety from wetting.

In the annexed drawings, Figure 1,— is a central vertical section of our improved hydrant detachably secured in place on a stand pipe of an irrigation pipe line. Fig. 2,— is a transverse section taken on line 2—2 of Fig. 1. Figs. 3— 4 and 5,— are enlarged details of various parts of the valve operating mechanism.

Referring more particularly to the drawings, 10 designates a concrete pipe line, provided with a stand pipe 11. This stand preferably projects a short distance above the surface of the ground, and around its outer circumferential edge is provided with a flange or shoulder 12, whose outer face is provided with a conical metallic band or seat 13. Secured in the pipe opening in any suitable manner, but preferably in the manner indicated in the drawings, is a circular valve seat 14, having a centrally disposed connecting bar or yoke 15 formed integrally therewith, from which projects upwardly a centrally disposed threaded pin 16. Operatively mounted on pin 16 is a circular valve disk plate 17 which controls the flow of water from the stand pipe. As the valve above referred to forms no part of our invention we will not describe it more fully other than to show its connection thereto.

Referring now more particularly to Fig. 1 of the drawings 20 designates a cylindrical casing preferably formed of sheet iron, closed at the top by a head 21 preferably formed of the same material and bolted or otherwise secured thereto. Casing 20 is preferably provided with a discharge outlet 22, bolted or riveted thereto from which the temporary pipe line (not shown) may be attached. Head 21 is provided with a centrally disposed bearing 23 bolted thereto, and it is further provided with a second bearing 24 secured in the same manner as the first mentioned bearing. Mounted in these bearings is a valve operating mechanism which preferably consists of a hollow shaft 26, provided on its upper end with an operating handle 27, secured thereto in any suitable and convenient manner. To the lower end of shaft 26 and in screw threaded engagement therewith is a bearing block or head 28 to which are pivotally secured a plurality of bell crank levers 29, each being provided on its lower arm 30, and preferably at or near the end thereof with an inwardly projecting lug or dog 31 adapted to enter an aperture 32 formed in the central bearing or spanner nut 33 secured to the valve. The upper arms 34 of these bell crank levers project inwardly toward each other directly beneath the lower end of shaft 26. Mounted in shaft 26 as particularly illustrated in Fig. 3 of the drawings, is a spring operated rod 35 mounted in bearings 36 attached respectively to the top and bottom of the shaft. This rod is provided with an operating disk or hand hold 37, and attached to the rod is a collar 38. Interposed between collar 38 and the lower bearing 36 is a coiled compression spring 39 which normally forces rod 35 upwardly and pressure foot or disk 40 out of engagement with the bell crank levers 29. When rod 35 is forced downwardly disk 40 contacts with the upper ends of the bell crank levers 29 and forces the lugs out of engagement with the apertures 32 formed in the central bearing 33 which is secured to the circular valve plate 17. In this way a detachable clutch is formed.

Casing 20 is preferably provided on its outer cylindrical surface with a plurality of bearing lugs 41 arranged in pairs, through the apertures 41' of which are adapted to pass rods 42 which are hooked on their ends as at 43 and adapted, when rotated to engage the flange 12 formed on the upper outer edge of the stand pipe 11. The upper ends of these rods are preferably screw threaded and are provided with winged thumb nuts 44 by means of which the casing 20 is forced into a water engagement with the flange 12 on the stand pipe.

The casing 20 is formed of sheet metal, so that it is not a rigid cylinder as it would be if formed of cast iron or similar metal. By forming the casing of sheet metal in this way, it has a desirable elasticity when it is being clamped upon the conical seat, and its lower edge adapts itself to the form of the seat and forms a tight joint, and attention is called to the fact that on this account it is unnecessary to form a beveled or conical lower edge on the casing.

The operation of the device is as follows:—When it is desired to lead a temporary line to any particular section of the ranch or field the portable hydrant is conveyed to the stand pipe nearest to that section. The casing is first placed over the stand pipe and the hooked rods are rotated into engagement with the flange 12 after which the thumb nuts are tightened so that the casing will be sustained in an upright and water tight position on the stand pipe. Hollow shaft 26 is then forced downwardly, pressure being applied to disk 37 so as to force the bell crank levers 29 outwardly so that the dogs 31 will drop into the apertures 32 formed in the centrally disposed bearing 33. After the lugs 31 have entered the apertures in the bearing 33 the shaft 26 is rotated so as to disengage the valve plate from its seat. After which shaft 26 is drawn upwardly out of the way into the upper part of the casing 20, the shaft being secured in its drawn up position in any suitable manner but preferably by means of a set screw 45 secured in bearing 24.

It will be observed from the foregoing description that we have provided a portable hydrant by means of which a temporary pipe line may be connected to a stand pipe with little or no inconvenience and avoiding all danger of the wetting of the operator.

Having described our invention, what we claim is:—

1. A stand pipe having a flange with a substantially conical seat on the upper side thereof, a cylindrical casing of pliable sheet metal open at its lower end having a plain untapered lower edge resting upon said conical seat, a disk normally closing said stand pipe, a rotatable shaft mounted in said casing and means for connecting said shaft with said disk to raise said disk to permit a flow through said stand pipe, said casing having a discharge outlet therefrom.

2. A stand pipe having a casing seat formed thereupon, a disk, a threaded pin, a spanner nut mounted on said pin and adapted to move said disk when rotated, a casing adapted to rest on the seat formed on said stand pipe, a shaft rotatably mounted in said casing, a clutch carried by the lower end of said shaft, and means for actuating said clutch to engage said spanner nut.

3. A stand pipe, a disk normally closing the end of said stand pipe, said stand pipe having a flange forming a casing seat, a cylindrical casing open at its lower end and adapted to have its lower edge rest on said seat, draw rods rotatably mounted at the sides of said casing and having laterally disposed extensions adapted to project under said flange, wing nuts having threaded engagement with said draw rods and adapted to force said casing downwardly to secure the same on said stand pipe, a shaft mounted in said casing, a clutch mounted on said shaft and adapted to connect detachably with said disk to raise the same, and means for operating said clutch from the exterior of said casing.

4. A stand pipe having a valve seat, a disk normally resting on said seat to close off the flow through said stand pipe, a threaded pin, a nut mounted on said threaded pin and adapted to advance or withdraw said disk, said nut having openings in the face thereof, a shaft extending through said casing, a clutch carried on said shaft and having movable dogs adapted to engage in said openings to connect said shaft with said nut, and means for operating said dogs from the exterior of said casing.

5. A disk valve having a normally exposed rotatable member of substantially circular form having recesses in the face thereof, a portable valve casing adapted to seat over said valve, a rotatable shaft passing through the wall of said casing and adapted to be rotated from the exterior, a clutch carried by said shaft and having members adapted to engage in said recesses to move said rotatable member, and means for actuating said clutch from the exterior of said casing.

In witness that we claim the foregoing we have hereunto subscribed our names this 23rd day of September, 1908.

GEORGE E. KELLAR.
ELMER O. THOMASON.

Witnesses:
 EDMUND A. STRAUSE,
 OLLIE PALMER.